United States Patent
Sakamoto

(10) Patent No.: US 12,005,515 B2
(45) Date of Patent: Jun. 11, 2024

(54) DIFFERENT MATERIAL JOINING METHOD

(71) Applicant: SUBARU CORPORATION, Tokyo (JP)

(72) Inventor: Noboru Sakamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 301 days.

(21) Appl. No.: 17/342,744

(22) Filed: Jun. 9, 2021

(65) Prior Publication Data
US 2021/0387279 A1    Dec. 16, 2021

(30) Foreign Application Priority Data

Jun. 12, 2020  (JP) ................................ 2020-102096

(51) Int. Cl.
  *B23K 11/20*  (2006.01)
  *B23K 11/11*  (2006.01)
  *B23K 11/30*  (2006.01)

(52) U.S. Cl.
  CPC ............. *B23K 11/20* (2013.01); *B23K 11/115* (2013.01); *B23K 11/3009* (2013.01)

(58) Field of Classification Search
  CPC ... B23K 11/115; B23K 11/20; B23K 11/3009; B23K 11/34; B23K 2103/20; B23K 33/002
  USPC ....................................................... 219/118
  See application file for complete search history.

(56) References Cited

U.S. PATENT DOCUMENTS

| 2012/0156561 A1 | 6/2012 | Onose et al. |
| 2015/0273620 A1* | 10/2015 | Sakamoto .............. B23K 11/20 403/179 |

FOREIGN PATENT DOCUMENTS

| JP | H6-7958 | 1/1994 |
| JP | 2009-226446 A | 10/2009 |
| JP | 2012-125819 A | 7/2012 |

OTHER PUBLICATIONS

Office Action mailed Apr. 2, 2024 for Japanese Patent Application No. 2020-102096 (2 pages in Japanese; 4 pages English translation).

* cited by examiner

*Primary Examiner* — Dana Ross
*Assistant Examiner* — Joseph W Iskra
(74) *Attorney, Agent, or Firm* — Smith, Gambrell & Russell, LLP

(57) ABSTRACT

A different material joining method sandwiches, with electrodes, a first joining member and a second joining member lower in melting point than the first member, applies pressure and electricity to them, and joins them in preset joint parts. The method includes forming a discontinuous abutting part beforehand in the joint part of at least one of the two members. The two members abut onto the abutting part in a discontinuous state. The method includes melting the second member by sandwiching the joint parts with the electrodes and applying pressure and electricity on the joint parts in a state where the two members abut onto each other in the joint parts while the abutting part is included. The method includes welding both the members by bringing a melting material of the second member into interface joining with a surface of the first member toward the second member.

20 Claims, 16 Drawing Sheets

DIFFERENT MATERIAL JOINING METHOD

CROSS-REFERENCE TO RELATED APPLICATIONS

The present application claims priority from Japanese Patent Application No. 2020-102096 filed on Jun. 12, 2020, the entire contents of which are hereby incorporated by reference.

BACKGROUND

The disclosure relates to a different material joining method and particularly to a different material joining method to join a first joining member like a plate and a second joining member like a plate, which is lower in melting point than the first joining member.

Resistance welding as one of joining methods has advantages, such as a low frequency of distortion, favorable external appearance, and a short duration of welding, and in the automobile industry, is widely employed for production of car bodies for example. As known, resistance welding, also referred to as spot welding in general, is performed mainly by the joining members themselves being melted by the Joule heat caused by contact resistance between the joining members. A joining member used for a car body most typically in such resistance welding is a plate material of steel, a so-called steel plate. On the other hand, a plate material of aluminum (alloy) has been being used for reduction in the weight of a car body for example. Although resistance welding techniques for joining members of aluminum is becoming established, different material resistance welding, which is for example mass production resistance welding, for a joining member of aluminum and a joining member of an iron-based material, such as a steel plate, is still being developed since the melting points of these joining members are largely different from each other.

A technique of joining such different materials that differ in melting point by resistance welding is described in Japanese Unexamined Patent Application Publication (JP-A) No. H6-7958 for example, which is described below. In the different material joining method, for example, a material higher in melting point than aluminum and not higher in melting point than steel, such as a small piece of iron, is sandwiched between joint parts of a joining member of aluminum and a joining member of steel, and with this small piece being sandwiched, the joining member of aluminum and the joining member of steel are sandwiched with electrodes and undergo pressure application and energization so that both the joining members are welded. It is described that at this time, by making the number of contact points between the joining member of steel and the small piece smaller than the number of contact points between the joining member of aluminum and the small piece, the joining member of steel high in melting point and the small piece are melted earlier and after that, the joining member of aluminum and the small piece are melted.

SUMMARY

An aspect of the disclosure provides a different material joining method in which a first joining member having a plate shape and a second joining member having a plate shape are sandwiched with facing electrodes and undergo pressure application and energization, and the first joining member and the second joining member are joined in a first joint part of the first joining member and a second joint part of the second joining member that are set in advance. The second joining member is lower in melting point than the first joining member. The different material joining method includes forming a discontinuous abutting part in advance in either one or both of the joint first part and the second joint part. Both the first joining member and the second joining member abut onto the discontinuous abutting part in a discontinuous state. The different material joining method includes melting the second joining member by sandwiching the first joint part and the second joint part with the electrodes and performing the pressure application and the energization on the either one or both of the first joint part and the second joint part in a state where the first joining member and the second joining member are caused to abut onto each other in the either one or both of the first joint part and the second joint part while the discontinuous abutting part is included. The different material joining method includes welding both the first joining member and the second joining member by bringing a melting material of the second joining member into interface joining with a surface of the first joining member toward the second joining member.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

When the different material joining method described in JP-A No. H6-7958 mentioned above is used for, for example, mass production resistance welding of plate members for car bodies, such as mass production resistance welding where robots are used, it is difficult to interpose and hold a small piece as a unit separate from the joining members, which are transferred along a line, between the joint parts of the joining members or to cause an electrode to suitably abut onto the part where the small piece is sandwiched. If a small piece as a separate unit can be interposed and held between the joining members, it is difficult to find the part where the small piece is sandwiched from the outside of the joining members. Although, for example, a plate member for a car body is molded by press working with the accuracy of the working being not so high, robots can perform resistance welding merely on the positions desired through teaching and therefore, the resistance welding is not necessarily performed on the location where the small piece is sandwiched, properly.

It is desirable to provide a different material joining method that enables it to weld plate-like joining members different in melting point even in an already-existing mass production resistance welding facility where robots are used for example.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
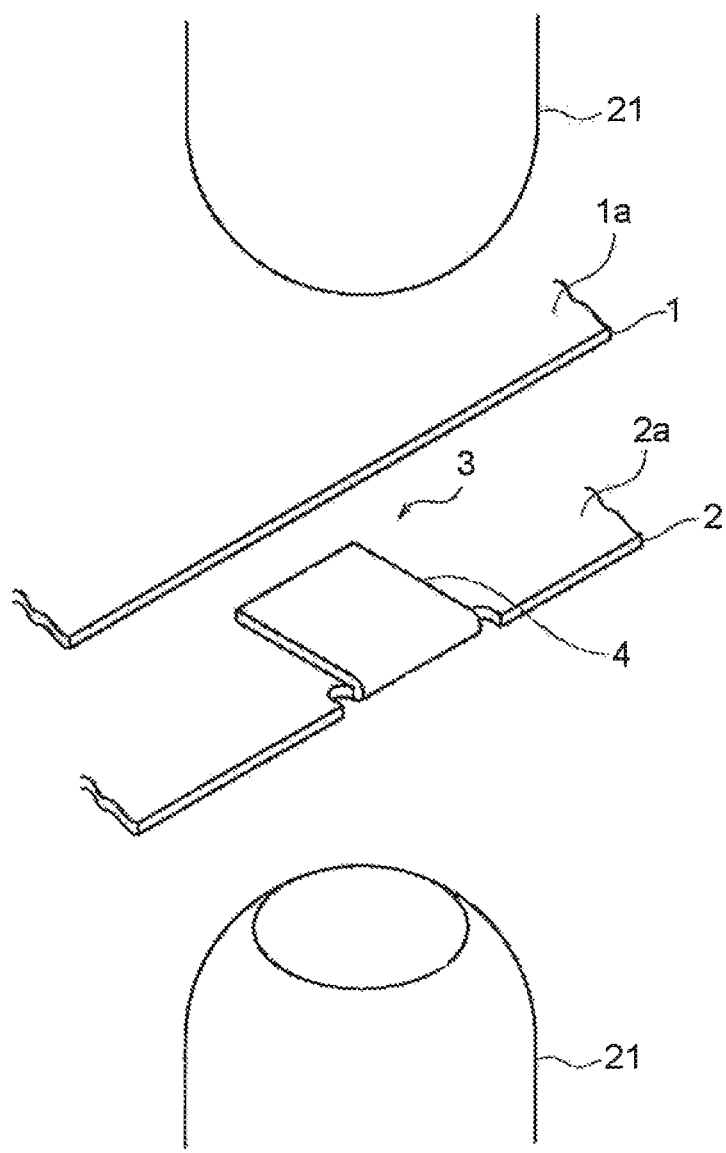
FIG. 1 is a perspective view that illustrates a different material joining method according to a first embodiment of the disclosure.
Figure 2A:
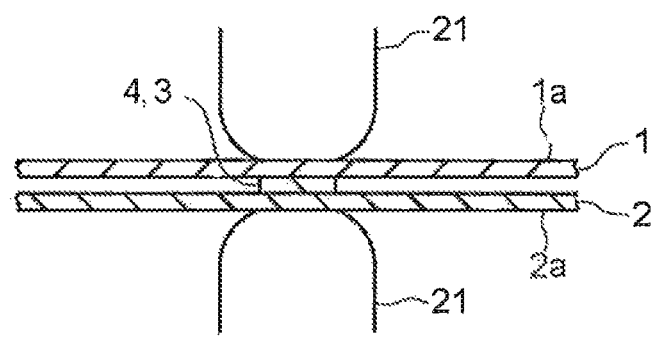
FIGS. 2A and 2B are explanatory views of the different material joining method in FIG. 1.
Figure 2B:
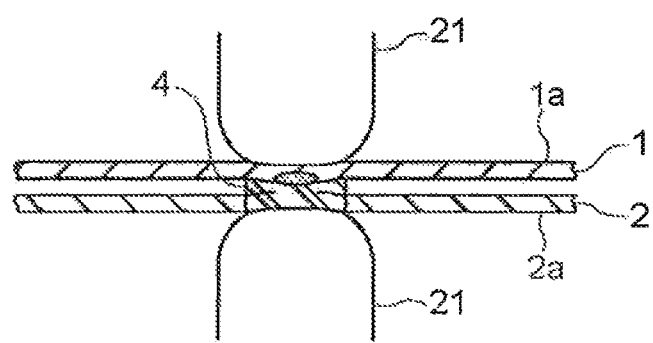

FIG. 1 is a perspective view that illustrates the different material joining method according to a first embodiment of the disclosure and FIGS. 2A and 2B are explanatory views of the different material joining method in FIG. 1. The drawings used in the embodiments below are each an example of the different material joining method according to an embodiment of the disclosure and for instance, the shape and size of plate-like joining members 1 and 2, the shape and size of a discontinuous abutting part described later, and the like can be set or changed according to the specifications or features of the joining of the different materials to be applied. In each of the embodiments below, joint parts of the two plate-like joining members 1 and 2 are sandwiched with facing electrodes 1 and 2 and with electrodes 21 applying pressure to the joining members 1 and 2, energization between the electrodes 21 is performed. The welding state at the time of energization is described later.

In the joining members to be joined in each of the embodiments below, the first joining member 1 is a steel plate and the second joining member 2, which is lower in melting point than the first joining member 1, is a plate member of aluminum. As described above, the shapes or sizes (plate thicknesses) of both the joining members 1 and 2 can be set or changed according to the specifications or features as appropriate. As characteristics of both the joining members 1 and 2, the electrical resistance of the first joining member 1 constituted by a steel plate is larger than the electrical resistance of the second joining member 2 being a plate member of aluminum. In each of the examples of FIGS. 1 and 2, the first joining member (steel plate) 1 is disposed on the upper side in the illustration while the second joining member (plate member of aluminum) 2 is disposed on the lower side in the illustration. In the present embodiment, an end of the second joining member 2 like a plate is partially extended like a tongue and the extended part undergoes folding working so as to be folded toward the upper side in the illustration and the upper surface of the folded part 4 in the illustration is caused to abut onto the lower surface of the first joining member 1 in the illustration. Thus, the folded part 4 constitutes a discontinuous abutting part 3, which abuts onto the first joining member 1 locally or partially in the discontinuous state.

The abutment area of the first joining member 1 and the second joining member 2, which is caused by the discontinuous abutting part 3 constituted by the folded part 4, is predetermined according to the size of the folded part 4. In the present embodiment, the abutment area of the discontinuous abutting part 3 of the second joining member 2, which is constituted by the folded part 4, and the first joining member 1 is set so as to be smaller than or equal to or be preferably smaller than the abutment area of the second joining member 2 and the electrode 21 (almost the same as the abutment area of the first joining member 1 and the electrode 21). Accordingly, as described later, the energization cross-sectional area in a direction orthogonal to the electrode pressure-application direction at the time of energization on the first joining member 1 and the second joining member 2 with interposition of the discontinuous abutting part 3 is smaller than or equal to an equivalent of the energization cross-sectional area in a case without any discontinuous abutting part.

FIGS. 2A and 2B are explanatory views of welding action in the different material joining method in FIG. 1. FIG. 2A schematically illustrates a state before energization and FIG. 2B schematically illustrates a state after the energization. As illustrated in FIG. 2A, when the energization is performed with the electrodes 21 sandwiching the first joining member 1 and the second joining member 2 while applying pressure thereto, a part of the first joining member 1 abutting on the discontinuous abutting part 3 (a part surrounded by the ellipse in FIG. 2B), which is larger in electrical resistance than the second joining member 2 being a plate member of aluminum and is constituted by a steel plate, rises in temperature because of contact resistance and the heat from the abutting part melts the second joining member 2 being a plate member of aluminum with a melting point that is low, particularly the folded part 4. The melting material of the second joining member 2 flows to the surroundings from the abutting part of the discontinuous abutting part 3 since pressure is applied from the electrodes 21 to the joint part, and the flow causes interface joining with a surface of the first joining member 1 toward the second joining member 2. As known regarding brazing or the like, the interface joining is a welding form that involves no melting of the base material or that the melting of the base material is locally limited in.

In contrast, the discontinuous abutting part 3 constituted by the folded part 4 and a plate material 2a of the second joining member 2 itself are the same materials and thus, as illustrated in FIG. 2B, can be mutually melted and coagulated to cause resistance welding. At this time, for example, as is clear from FIG. 2A, side ends of the discontinuous abutting part 3 in the illustration are cut out from the second joining member 2 as a base material and at least during a period until the above-described melting early stage, no thermal conductivity to the plate material 2a of the second joining member 2 occurs from the ends of the discontinuous abutting part 3 and the folded part 4 that constitutes the discontinuous abutting part 3 can be sufficiently heated and melted. Further, the plate material 2a of the second joining member 2 is doubled in the folded part 4 and therefore, as described above, even when the discontinuous abutting part 3 is melted and flows to the surroundings, decrease in plate thickness, i.e. base material thinning can be reduced.

Figure 3A:
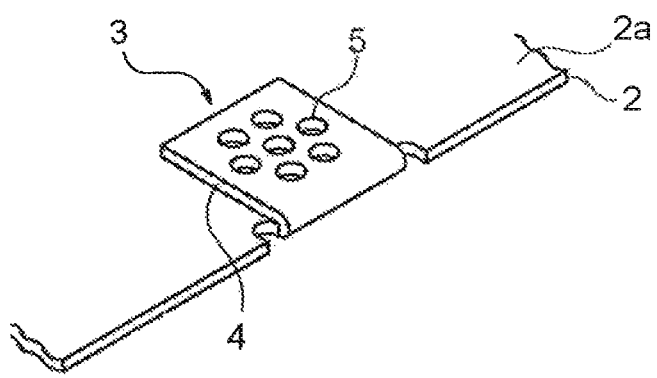
FIGS. 3A to 3D are perspective views that illustrate variations of a discontinuous abutting part in the different material joining method in FIG. 1.
Figure 3B:
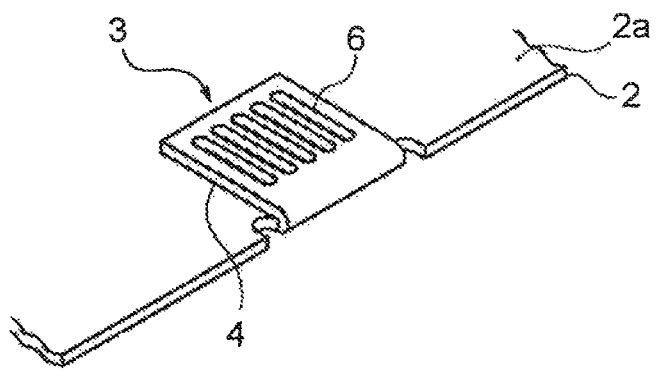
Figure 3C:
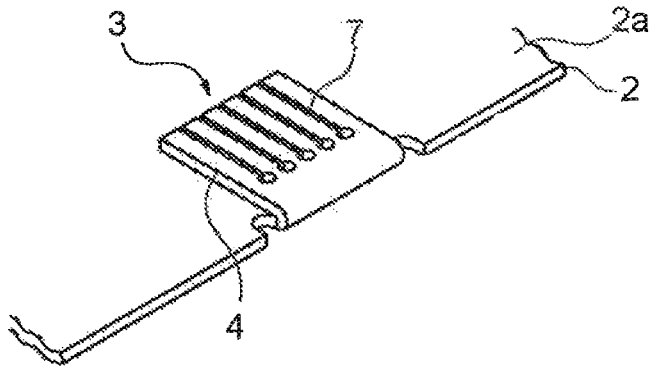
Figure 3D:
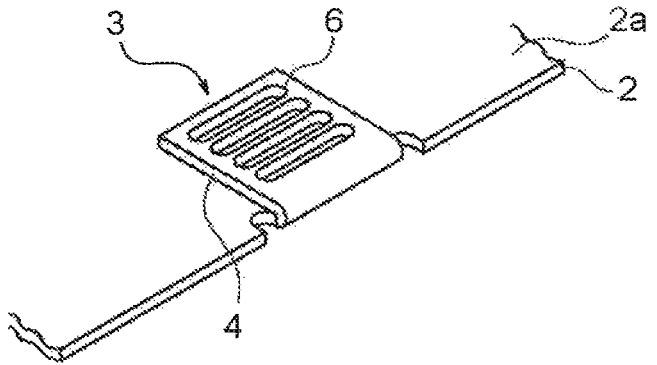

FIGS. 3A to 3D illustrate variations of the discontinuous abutting part 3 in the different material joining method in FIG. 1. In these examples, machining is performed on the above-described discontinuous abutting part 3 of the second joining member 2, which is constituted by the folded part 4. For example, in FIG. 3A, hole machining is performed on the above-described discontinuous abutting part 3 constituted by the folded part 4 and a plurality of through round holes 5 are formed. In FIG. 3A, similar to the following examples, the machined through parts that are formed do not pass through the plate material 2a of the second joining member 2 itself being the base material. In FIG. 3B, slot machining is performed on the above-described discontinuous abutting part 3 constituted by the folded part 4 and through oblong holes 6 are formed, which each have a cross section with an ellipse that is longer in the direction in which the folded part 4 is folded. In FIG. 3C, slit machining is performed on the above-described discontinuous abutting part 3 constituted by the folded part 4 and through slits 7 are formed, which are longer from the upper left side to the lower right side in the illustration. In FIG. 3D, slot machining is performed on the above-described discontinuous abutting part 3 constituted by the folded part 4 and through oblong holes 6 are formed, which each have a cross section with an ellipse that is longer in the direction orthogonal to the direction in which the folded part 4 is folded.

Figure 4A:
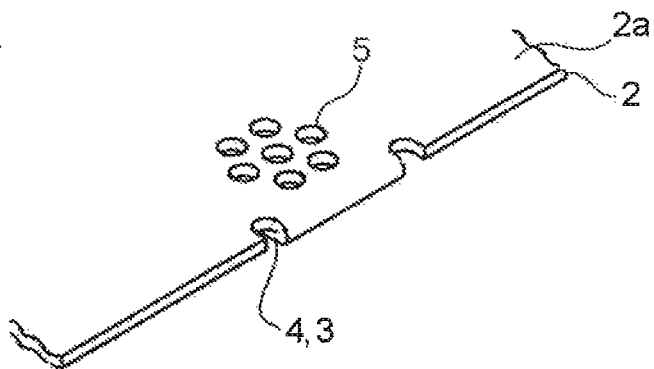
FIGS. 4A to 4C are perspective views that illustrate variations of the discontinuous abutting part in the different material joining method in FIG. 1.
Figure 4B:
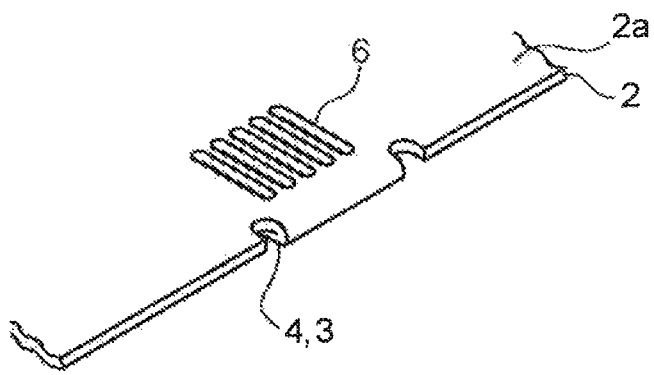
Figure 4C:
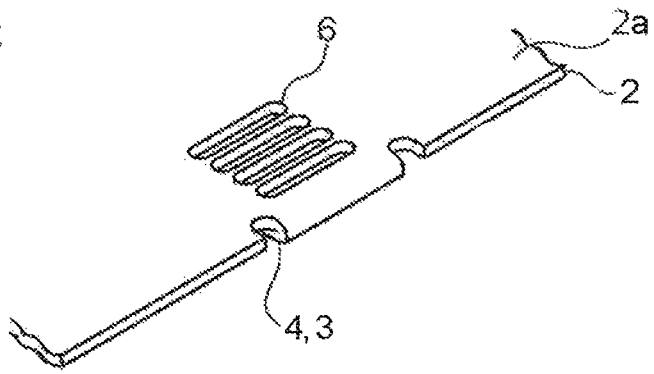

FIGS. 4A to 4C illustrate different variations of the discontinuous abutting part 3 in the different material joining method in FIG. 1. In these examples, machining is performed on a part that is included in the plate material 2a of the second joining member 2 itself being the base material and that the above-described folded part 4 is folded in. For example, in FIG. 4A, hole machining is performed on the part that is included in the second joining member 2 and that the above-described folded part 4 is folded in, and a plurality of through round holes 5 are formed. In FIG. 4A, similar to the following examples, the machined through parts that are formed do not pass through the folded part 4 constituting the discontinuous abutting part 3. In FIG. 4B, slot machining is performed on the part that is included in the second joining member 2 and that the above-described folded part 4 is folded in, and through oblong holes 6 are formed, which each have a cross section with an ellipse that is longer in the direction in which the folded part 4 is folded. In FIG. 4C, slot machining is performed on the part that is included in the second joining member 2 and that the above-described folded part 4 is folded in, and through oblong holes 6 are formed, which each have a cross section with an ellipse that is longer in the direction orthogonal to the direction in which the folded part 4 is folded.

In these examples, penetration machining is performed on the folded part 4 constituting the discontinuous abutting part 3 and the plate material 2a of the second joining member 2, and holes, slots, slits, or the like are formed. Accordingly, ends, edges, corners, and the like thereof enable thermal conductivity in the plate material 2a to be reduced and, by the reduced amount, even the second joining member 2 as a plate member of aluminum, which is small in electrical resistance, can be sufficiently heated and as a result, the second joining member 2 can be melted with reliability and welded with the first joining member 1. When these machined through parts are caused to abut onto the first joining member 1, the abutment area of the first joining member 1 and the second joining member 2 can be reduced and by the reduced amount, the calorific value of the first joining member 1 at the time of energization can be increased. Since such penetration machining can be performed, for example, concurrently with the press working for the second joining member 2, it is not desired to employ a new machining process.

In the example of FIG. 1, the folded part 4 that constitutes the discontinuous abutting part 3 is caused to abut onto the first joining member 1. Thus, when for example, the discontinuous abutting part 3 in any of FIGS. 3A to 3D is used, the machined through parts formed in the folded part 4 cannot be seen from the outside after the welding of the first joining member 1 and the second joining member 2. In contrast, when the discontinuous abutting part 3 in any of FIGS. 4A to 4C is used, the machined through parts formed in the second joining member 2 can be seen from the outside after the welding of the first joining member 1 and the second joining member 2. However, the above-described machined through parts indicate the positions of the discontinuous abutting part 3 constituted by the folded part 4 in the second joining member 2 and thus, the joint parts can be indicated clearly. As described above, the energization cross-sectional area can be set according to the size of the discontinuous abutting part 3 constituted by the folded part 4 and therefore, the folded part 4 can obtain an equivalent welding effect even when the folded part 4 is not on the side of the first joining member 1. When the folded part 4 is not on the side of the first joining member 1, the folded part 4 can be seen from the outside of the plate member even after the welding. Whether the folded part 4 is disposed on the outer side or disposed on the side of the first joining member 1 can be set as appropriate according to various conditions including the specifications or features, the external appearance of a product, and the transfer of the plate material.

Figure 5A:
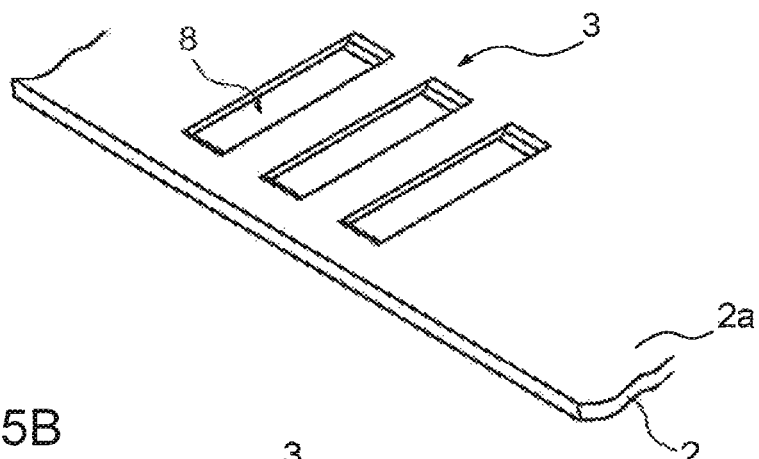
FIGS. 5A and 5B are perspective views that illustrate a different material joining method according to a second embodiment of the disclosure.
Figure 5B:
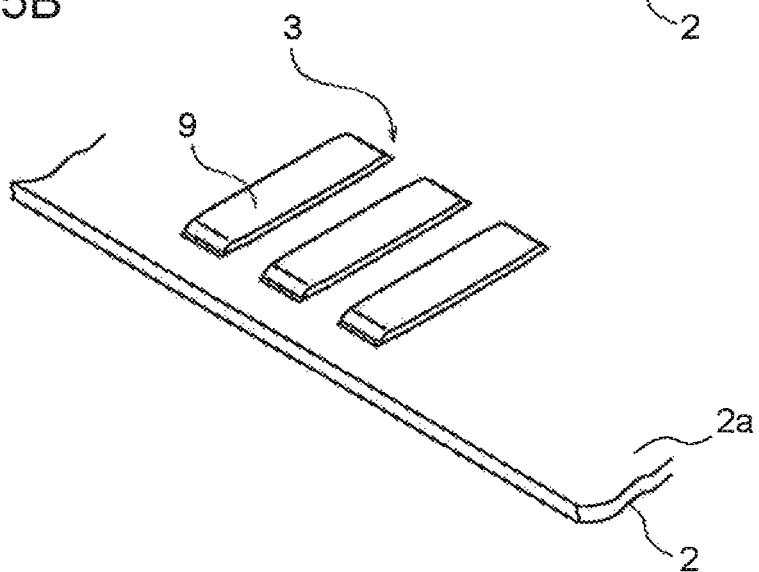
Figure 6A:
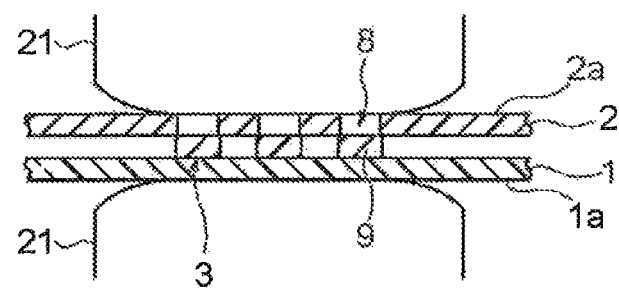
FIGS. 6A and 6B are explanatory views of the different material joining method in FIGS. 5A and 5B.
Figure 6B:
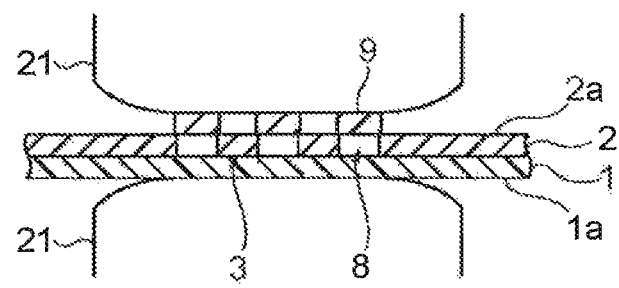

A different material joining method according to a second embodiment of the disclosure is described below. FIGS. 5A and 5B are each a perspective view that illustrates a discontinuous abutting part 3 in the different material joining method of the present embodiment and FIGS. 6A and 6B are each an explanatory view of the different material joining method in FIGS. 5A and 5B. FIG. 5A illustrates the discontinuous abutting part 3 when the second joining member 2 constituted by a plate member of aluminum is viewed from the side of its one surface and FIG. 5B illustrates the state in which the discontinuous abutting part 3 is viewed from the side of the opposite surface of a second joining member 2. In the discontinuous abutting part 3 in each of these examples, two slits orthogonal to a plate material end of the second joining member 2 are formed in each of three locations in the plate material end and the part between the two slits is extruded toward the lower side in the illustration of FIG. 5A at the time of the plate material press working for example, and a depression 8, which is longer in the direction orthogonal to the plate material end, is formed and the periphery of the depression 8 or a projection 9 extruded on the contrary to the depression 8 is caused to abut onto a first joining member 1 in the discontinuous state. As in FIG. 5B, the depressions 8 are regarded as the projections 9 when the second joining member 2 is viewed from the opposite side. Thus, the discontinuous abutting part 3 is formed by embossing.

FIGS. 6A and 6B are each a cross-sectional view taken when the above-described depressions 8 and projections 9 are viewed in their longitudinal direction from the side of the plate material end in a state where the second joining member 2 constituted by the plate member of aluminum is placed over the first joining member 1 that is disposed lower in the illustration and constituted by the steel plate. The regions of the depressions 8 and the projections 9, which constitute the discontinuous abutting part 3, serve as the joint parts of both the joining members 1 and 2 and the joint parts undergo pressure application and energization while being sandwiched by the electrodes 21. Accordingly, similar to the above-described first embodiment, the heat from the first joining member 1 melts the second joining member 2 and causes interface joining with the first joining member 1 to weld both the first joining member 1 and the second joining member 2. In this example, after the above-described depressions 8 are extruded toward the lower side in the illustration of FIG. 5A, pressure is further applied to the extruded parts, that is, the above-described projections 9 to crush the projections 9. Thus, the width of the projection 9 is slightly larger than the width of the depression 8 in the direction parallel to the plate material end surface. In FIG. 6A, the second joining member 2 is disposed with the projections 9 being positioned on the lower side in the illustration so that the projections 9 abut on the first joining member 1 and in FIG. 6B, on the contrary, the second joining member 2 is disposed with the depressions 8 being positioned on the lower side in the illustration so that the peripheries of the depressions 8 abut on the first joining member 1. Thus, in the example of FIG. 6A, the projections 9 extruded from the depressions 8 constitute the discontinuous abutting part 3 with the first joining member 1 and in the example of FIG. 6B, the peripheries of the depressions 8 constitute the discontinuous abutting part 3 with the first joining member 1.

For example, FIG. 6A denotes that while the abutting parts of the projections 9 and the first joining member 1 are continuous in the vertical direction in the view along the longitudinal direction of the projection 9, the above-described projection 9 in the lateral direction in the view, that is, in its width direction is sufficiently small for the electrode 21 and accordingly, the energization cross-sectional area is made small. Similarly, FIG. 6B denotes that while the abutting part of the projections 9 and the electrode 21 is continuous in the vertical direction in the view along the longitudinal direction of the projection 9, the above-described projection 9 in the lateral direction in the view, that is, in its width direction is sufficiently small for the electrode 21 and accordingly, the energization cross-sectional area is made small. Thus, in any of the cases of FIGS. 6A and 6B, the second joining member 2 constituted by the plate member of aluminum, which is low in electrical resistance, can be sufficiently heated and melted. Further, in this example, since the width of the projection 9 is larger than the width of the depression 8, the projection 9 is not pushed into the depression 8 even when the electrodes 21 apply pressure, and the state where the above-described energization cross-sectional area is small can be maintained.

Figure 7A:
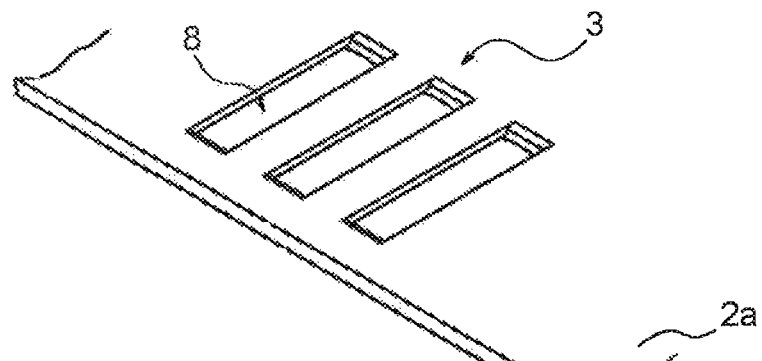
FIGS. 7A and 7B are perspective views that illustrates variations of a discontinuous abutting part in the different material joining method in FIGS. 5A and 5B.
Figure 7B:
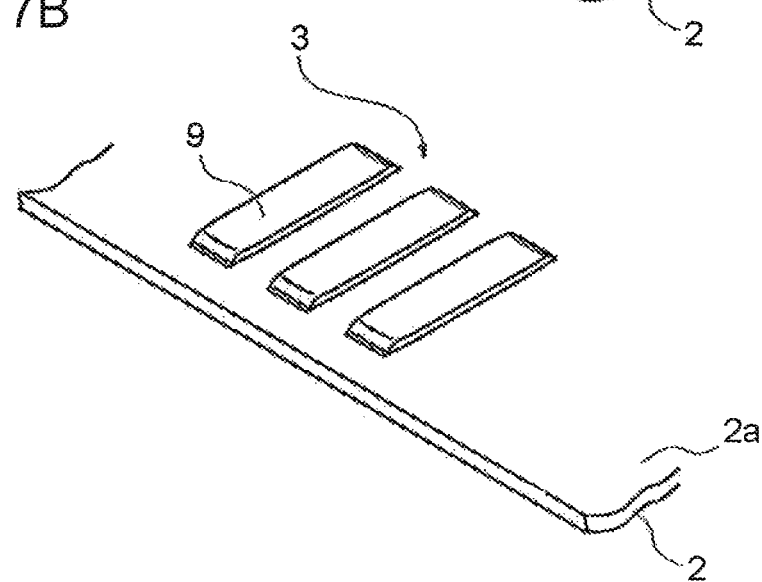
Figure 8:
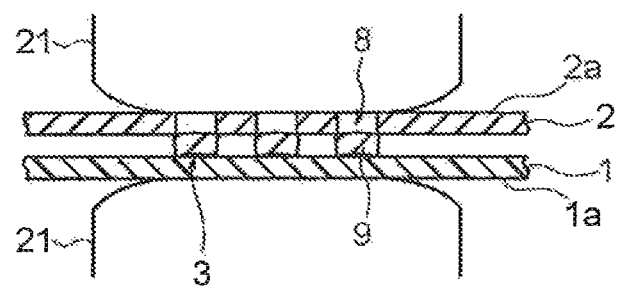
FIG. 8 is an explanatory view of the different material joining method in FIGS. 7A and 7B.

FIGS. 7A and 7B are perspective views that illustrate variations of the discontinuous abutting part 3 in the different material joining method in FIGS. 5A and 5B and FIG. 8 is an explanatory view of the different material joining method in FIG. 7A. Similar to FIGS. 5A and 5B, FIG. 7A illustrates the discontinuous abutting part 3 when the second joining member 2 constituted by a plate member of aluminum is viewed from the side of its one surface and FIG. 7B illustrates the discontinuous abutting part 3 viewed from the side of the opposite surface of the second joining member 2. Also in this example, in the discontinuous abutting part 3, two slits orthogonal to a plate material end of the second joining member 2 are formed in each of three locations in the plate material end and the part between the two slits is extruded toward the lower side in the illustration in FIG. 7A and a depression 8, which is longer in the direction orthogonal to the plate material end, is formed and the periphery of the depression 8 or a projection 9 extruded on the contrary to the depression 8 is caused to abut onto the first joining member 1 in the discontinuous state. In this example, further, a central part of the projection 9 in its width direction is depressed toward the opposite direction of its projecting direction to be curved with a mold used at the time of the plate material press working, or the like.

Similar to FIGS. 6A and 6B, FIG. 8 is a cross-sectional view taken when the above-described depressions 8 and projections 9 are viewed in their longitudinal direction from the side of the plate material end in a state where the second joining member 2 constituted by the plate member of aluminum is placed over the first joining member 1 disposed lower in the illustration and constituted by the steel plate. In this example, the second joining member 2 is disposed with the projections 9 being positioned on the lower side in the illustration so that the projections 9 abut on the first joining member 1. In this example, the above-described the depression 8 is extruded toward the lower side in the illustration of FIG. 7A and when the above-described projection 9 is crushed through the pressure application, the central part of the projection 9 is depressed toward the opposite direction of its projecting direction to be curved. Thus, as illustrated in FIG. 8, when the pressure application is started by the electrodes 21, ends of the projections 9 in their width direction simply abut on the first joining member 1. Thus, the energization cross-sectional area at the time when energization is started is further made smaller than those in FIGS. 5A, 5B, 6A, and 6B, and the second joining member 2 constituted by the plate member of aluminum, which is low in electrical resistance, can be melted with reliability. Similar to FIG. 6B, the second joining member 2 may be disposed so that the projections 9 are positioned on the side of the electrode 21.

Figure 9:
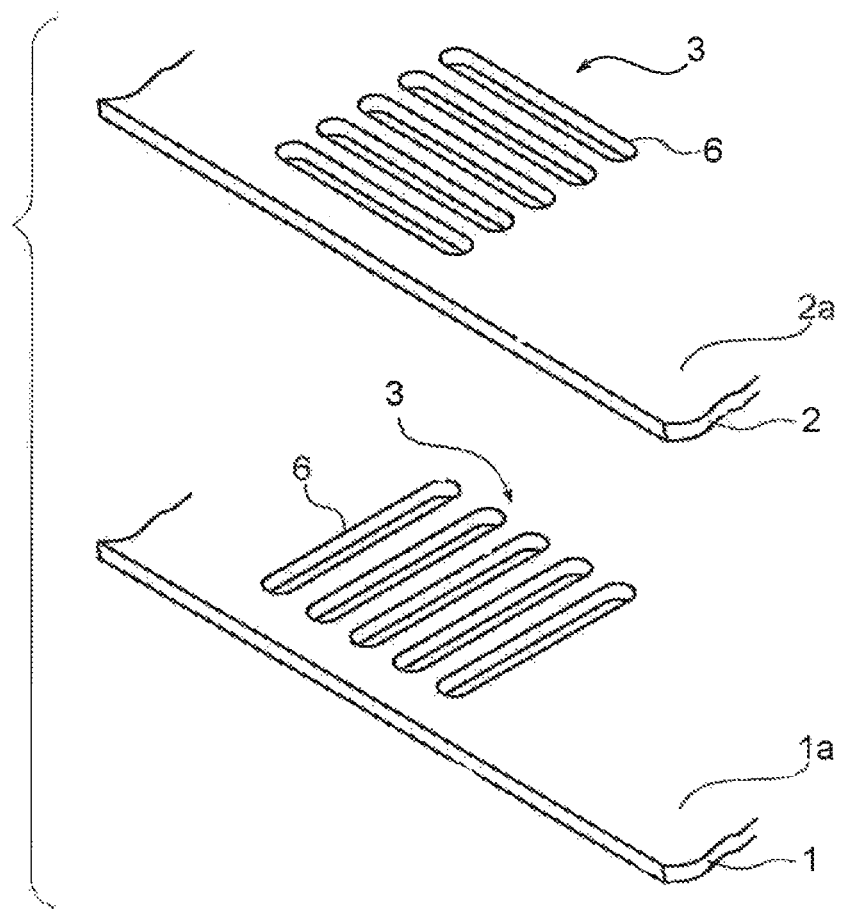
FIG. 9 is a perspective view that illustrates a different material joining method according to a third embodiment of the disclosure.
Figure 10A:
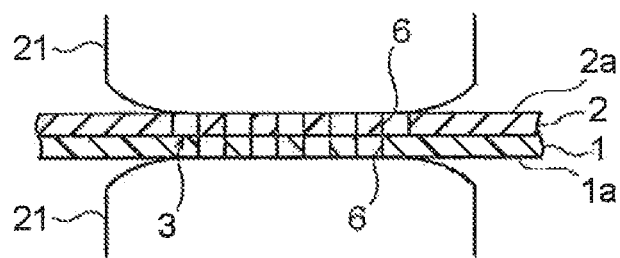
FIGS. 10A and 10B are explanatory views of the different material joining method in FIG. 9.
Figure 10B:
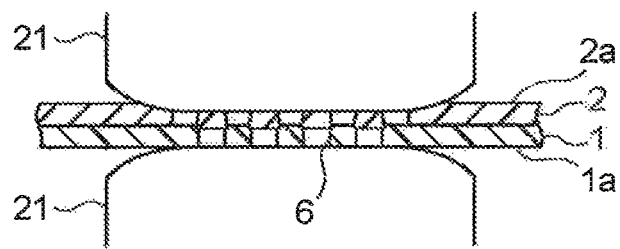

A different material joining method according to a third embodiment of the disclosure is described below. FIG. 9 is a perspective view that illustrates the different material joining method of the present embodiment and FIGS. 10A and 10B are each an explanatory view of the different material joining method in FIG. 9. In FIG. 9, a first joining member 1 constituted by a steel plate is positioned on the lower side in the illustration and a second joining member 2 constituted by a plate member of aluminum is positioned on the upper side in the illustration. In the present embodiment, a plurality of through oblong holes 6 longer in the direction orthogonal to a plate material end, the number of which is five in FIG. 9, are formed in a joint part of the first joining member 1 on the lower side so as to be aligned in the direction parallel to the plate material end and as a result, a discontinuous abutting part 3 is formed in the joint part. In contrast, a plurality of through oblong holes 6 longer in the direction parallel to a plate material end, the number of which is five in FIG. 9, are formed in a joint part of the second joining member 2 on the upper side so as to be aligned in the direction orthogonal to the plate material end and as a result, the discontinuous abutting part 3 is formed in the joint part. These through oblong holes 6 can be formed, for example, concurrently with the press working for the plate material. Moreover, as illustrated in FIGS. 10A and 10B, the joining members 1 and 2 are placed on each other so that the through oblong holes 6 of both the joining members 1 and 2 cross in the orthogonal directions and the parts where the through oblong holes 6 are placed on each other are sandwiched with the electrodes 21 as the joint parts and caused to undergo pressure application and energization. Accordingly, the heat from the first joining member 1 constituted by the steel plate melts the second joining member 2 constituted by the plate member of aluminum and the melting material causes interface joining with the first joining member 1, and both the joining members 1 and 2 are welded.

FIG. 10A is a cross-sectional view of a state where the first joining member 1 and the second joining member 2 are placed on each other and predetermined joint parts are sandwiched with the electrodes 21, which is viewed from the side of a plate material end, and FIG. 10B is a cross-sectional view of an initial state where the electrodes 21 cause both the joining members 1 and 2 to undergo pressure application and energization. In this example, as illustrated in FIG. 10A, the through oblong holes 6 of both the joining members 1 and 2 are positioned so as to cross each other in the orthogonal directions and thus, parts of the joining members 1 and 2 where the plate materials 1a and 2a are present or not present are aligned alternately. When both the joining members 1 and 2 placed on each other in the above-described disposition state are caused by the electrodes 21 to undergo pressure application and energization, as illustrated in FIG. 10B, the plate thickness of the second joining member 2 constituted by the plate member of aluminum, which is softened, decreases and is extended in the direction orthogonal to the thickness direction. The extended part is entangled like a wedge with the first joining member 1 constituted by the steel plate and after that, the second joining member 2 melts and causes interface joining, and both the joining members 1 and 2 are welded. Accordingly, the joint strength of both the joining members 1 and 2 can be enhanced. The through oblong holes 6 of both the joining members 1 and 2 are not necessarily desired to cross so as to be orthogonal but are just desired to cross so that the parts where the plate materials 1a and 2a are present or not present are positioned alternately.

Figure 11:
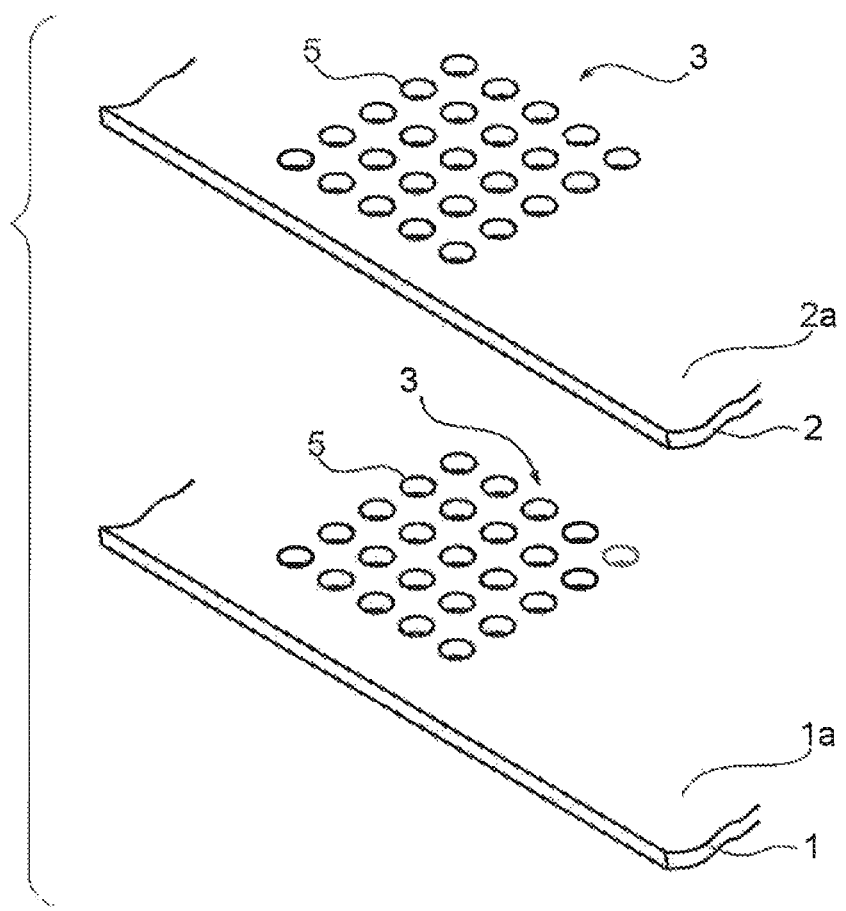
FIG. 11 is a perspective view that illustrates a variation of a discontinuous abutting part in the different material joining method in FIG. 9.
Figure 12A:
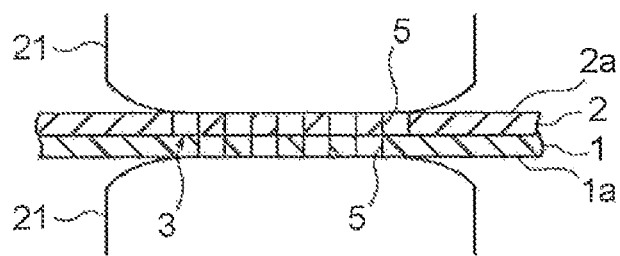
FIGS. 12A and 12B are explanatory views of the different material joining method in FIG. 11.
Figure 12B:
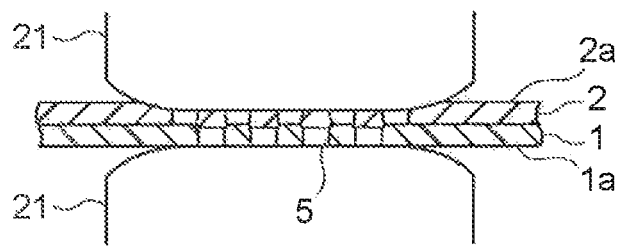

FIG. 11 is a perspective view that illustrates a variation of the discontinuous abutting part 3 in the different material joining method in FIG. 9, and FIGS. 12A and 12B are each an explanatory view of the different material joining method in FIG. 11. In this variation, a plurality of through round holes 5 are formed in the joint parts of both the joining members 1 and 2 with an equal pitch in directions parallel to a plate material end and directions orthogonal to the plate material end and as a result, the discontinuous abutting part 3 is formed. The through round holes 5 of both the joining members 1 and 2 are provided so that when the respective joint parts are placed on each other, parts of the joining members 1 and 2 where the plate materials 1a and 2a are present or not present are positioned alternately, that is, the through round holes 5 do not overlap each other. These through round holes 5 can be formed, for example, concurrently with the press working for the plate material. Moreover, as illustrated in FIGS. 12A and 12B, the joining members 1 and 2 are placed on each other so that the through round holes 5 of both the joining members 1 and 2 deviate from each other and the parts where the through round holes 5 are placed on each other are sandwiched with the electrodes 21 as the joint parts and caused to undergo pressure application and energization. Accordingly, the heat from the first joining member 1 constituted by the steel plate melts the second joining member 2 constituted by the plate member of aluminum and the melting material causes interface joining with the first joining member 1, and both the joining members 1 and 2 are welded.

FIG. 12A is a cross-sectional view of a state where the first joining member 1 and the second joining member 2 are placed on each other and predetermined joint parts are sandwiched with the electrodes 21, which is viewed from the side of the plate material end, and FIG. 12B is a cross-sectional view of an initial state where the electrodes 21 cause both the joining members 1 and 2 to undergo pressure application and energization. In this example, as illustrated in FIG. 12A, the through round holes 5 of both the joining members 1 and 2 are positioned so as to deviate from each other and thus, parts of the joining members 1 and 2 where the plate materials 1a and 2a are present or not present are aligned alternately. When both the joining members 1 and 2 placed on each other in the above-described disposition state are caused by the electrodes 21 to undergo pressure application and energization, as illustrated in FIG. 12B, the plate thickness of the second joining member 2 constituted by the plate member of aluminum, which is softened, decreases and is extended in the direction orthogonal to the thickness direction. The extended part is entangled like a wedge with the first joining member 1 constituted by the steel plate and after that, the second joining member 2 melts and causes interface joining, and both the joining members 1 and 2 are welded. Accordingly, the joint strength of both the joining members 1 and 2 can be enhanced.

Figure 13:
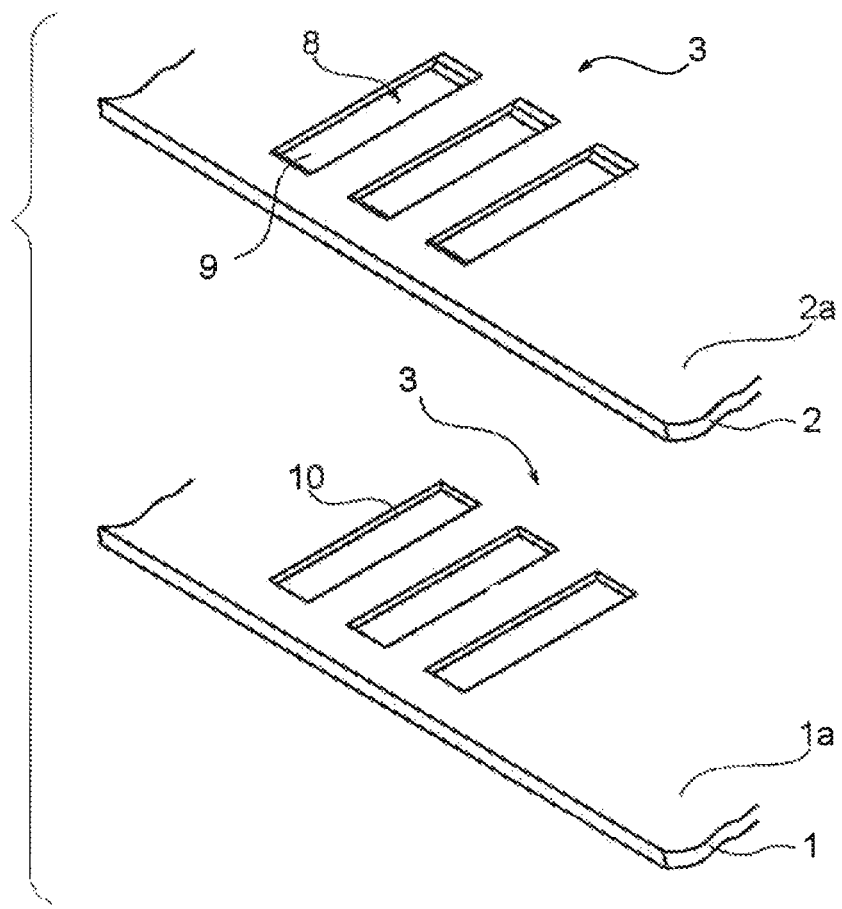
FIG. 13 is a perspective view that illustrates a different material joining method according to a fourth embodiment of the disclosure.
Figure 14A:
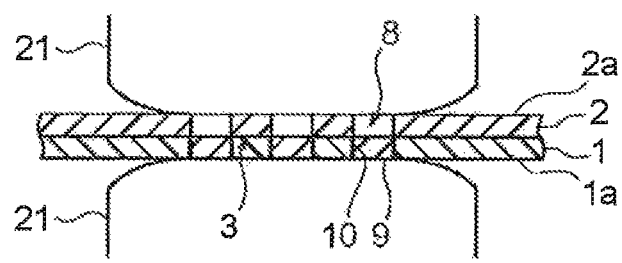
FIGS. 14A and 14B are explanatory views of the different material joining method in FIG. 13.
Figure 14B:
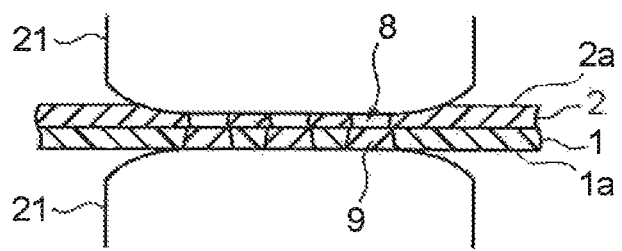

A different material joining method according to a fourth embodiment of the disclosure is described below. FIG. 13 is a perspective view that illustrates the different material joining method of the present embodiment and FIGS. 14A and 14B are each an explanatory view of the different material joining method in FIG. 13. In FIG. 13, a first joining member 1 constituted by a steel plate is positioned on the lower side in the illustration and a second joining member 2 constituted by a plate member of aluminum is positioned on the upper side in the illustration. In the present embodiment, similar to FIG. 5A described above, in the joint part of the second joining member 2 on the upper side, two slits orthogonal to the plate material end are formed in each of three locations in a plate material end of the second joining member 2 and the part between the two slits is extruded toward the lower side in the illustration of FIG. 13 at, for example, the time of the plate material press working and a depression 8, which is longer in the direction orthogonal to the plate material end, is formed and the projection 9 extruded on the contrary to the depression 8 is caused to abut onto the first joining member 1 in the discontinuous state. In contrast, in locations opposite the above-described projections 9 of the second joining member 2 in the joint part of the first joining member 1 on the lower side, three through rectangular holes 10 are formed, which are rectangular and which the projections 9 are accommodated relatively tightly in, and as a result, a discontinuous abutting part 3 is formed. In the present embodiment, the projections 9 of the above-described second joining member 2 are not crushed.

FIG. 14A is a cross-sectional view of a state where the first joining member 1 and the second joining member 2 are placed on each other and predetermined joint parts are sandwiched with the electrodes 21, which is viewed from the side of a plate material end, and FIG. 14B is a cross-sectional view of an initial state where the electrodes 21 cause both the joining members 1 and 2 to undergo pressure application and energization. In this example, as illustrated in FIG. 14A, both the joining members 1 and 2 are placed on each other so that the projections 9 of the second joining member 2 are accommodated relatively tightly in the through rectangular holes 10 of the first joining member 1. When both the joining members 1 and 2 placed on each other in the above-described disposition state are caused by the electrodes 21 to undergo pressure application and energization, as illustrated in FIG. 14B, the plate thickness of the second joining member 2 constituted by the plate member of aluminum, which is softened, decreases and the projection 9 is extended in the direction orthogonal to the plate thickness direction. The extended part is entangled like a wedge with the first joining member 1 constituted by the steel plate and after that, the second joining member 2 melts and causes interface joining, and both the joining members 1 and 2 are welded. Accordingly, the joint strength of both the joining members 1 and 2 can be enhanced.

Figure 15:
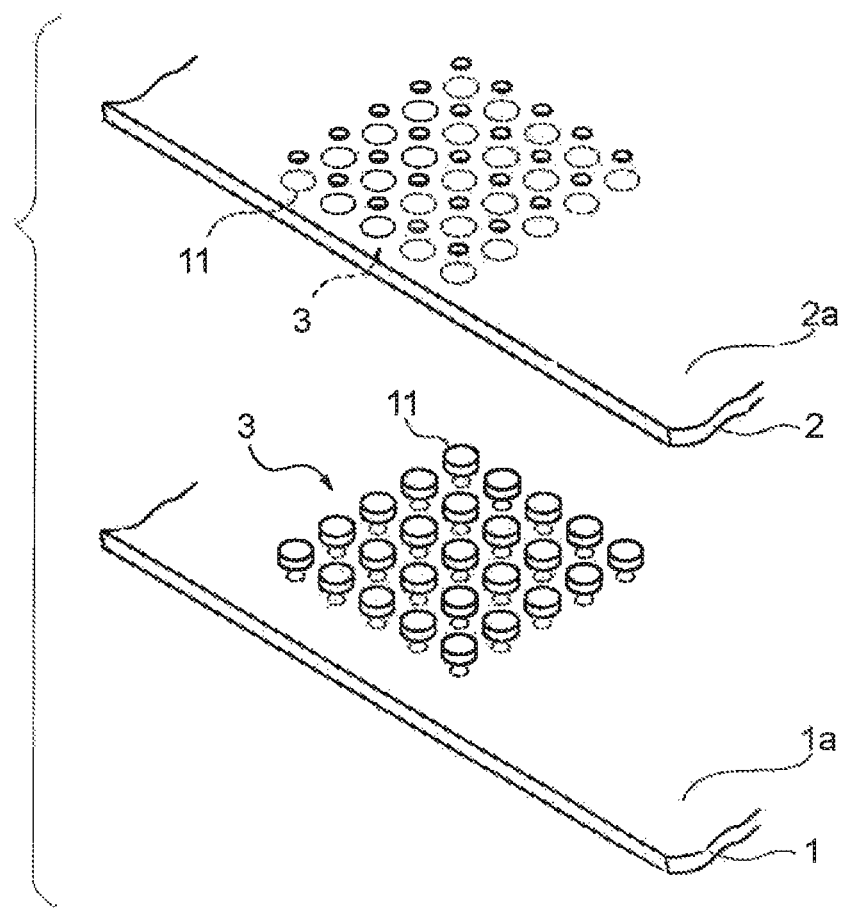
FIG. 15 is a perspective view that illustrates a different material joining method according to a fifth embodiment of the disclosure.
Figure 16A:
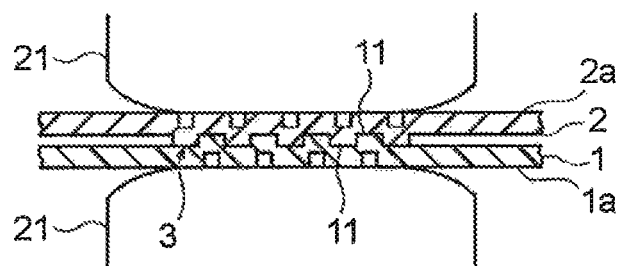
FIGS. 16A and 16B are explanatory views of the different material joining method in FIG. 15.
Figure 16B:
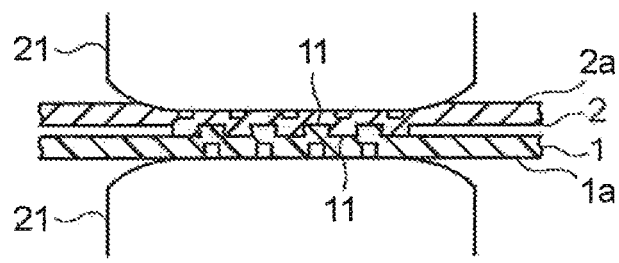

A different material joining method according to a fifth embodiment of the disclosure is described below. FIG. 15 is a perspective view that illustrates the different material joining method of the present embodiment and FIGS. 16A and 16B are each an explanatory view of the different material joining method in FIG. 15. In FIG. 15, a first joining member 1 constituted by a steel plate is positioned on the lower side in the illustration and a second joining member 2 constituted by a plate member of aluminum is positioned on the upper side in the illustration. In the present embodiment, in the joint part of the second joining member 2 on the upper side, a plate material 2a is pressed from the upper side toward the lower side in FIG. 15 in a plurality of locations with an equal pitch in directions parallel to a plate material end and directions orthogonal to the plate material end and embossing is performed for bottomed cylindrical parts 11, which project toward the lower side in FIG. 15, and as a result, the discontinuous abutting part 3 is formed. Further, in the joint part of the first joining member 1 on the lower side, a plate material 1a is pressed from the lower side toward the upper side in FIG. 15 in a plurality of locations with an equal pitch in directions parallel to the plate material end and directions orthogonal to the plate material end and embossing is performed for the bottomed cylindrical parts 11, which project toward the upper side in FIG. 15, and as a result, the discontinuous abutting part 3 is formed. These bottomed cylindrical parts 11 are also projections that project from the respective plate materials 1a and 2a of the joining members 1 and 2. The bottomed cylindrical parts 11 of both the joining members 1 and 2 are provided so as not to overlap each other when the respective joint parts are placed on each other. These bottomed cylindrical parts 11 can be formed, for example, concurrently with the press working for the plate material. Moreover, as illustrated in FIGS. 16A and 16B, the joining members 1 and 2 are placed on each other so that the bottomed cylindrical parts 11 of both the joining members 1 and 2 deviate from each other and the parts where the bottomed cylindrical parts 11 are placed on each other are sandwiched with the electrodes 21 as the joint parts and caused to undergo pressure application and energization. Accordingly, the heat from the first joining member 1 constituted by the steel plate melts the second joining member 2 constituted by the plate member of aluminum and the melting material causes interface joining with the first joining member 1, and both the joining members 1 and 2 are welded.

FIG. 16A is a cross-sectional view of a state where the first joining member 1 and the second joining member 2 are placed on each other and predetermined joint parts are sandwiched with the electrodes 21, which is viewed from the side of a plate material end, and FIG. 16B is a cross-sectional view of an initial state where the electrodes 21 cause both the joining members 1 and 2 to undergo pressure application and energization. In this example, as illustrated in FIG. 16A, the bottomed cylindrical parts 11 of both the joining members 1 and 2 are positioned so as to deviate from each other and thus, the respective bottomed cylindrical parts 11 of the joining members 1 and 2 are aligned alternately. When both the joining members 1 and 2 placed on each other in the above-described disposition state are caused by the electrodes 21 to undergo pressure application and energization, as illustrated in FIG. 16B, the plate thickness of the second joining member 2 constituted by the plate member of aluminum, which is softened, decreases and the bottomed cylindrical part 11 of the second joining member 2 is extended in the direction orthogonal to the plate thickness direction. The extended part is entangled like a wedge with the first joining member 1 constituted by the steel plate and after that, the second joining member 2 melts and causes interface joining, and both the joining members 1 and 2 are welded. Accordingly, the joint strength of both the joining members 1 and 2 can be enhanced.

Figure 17:
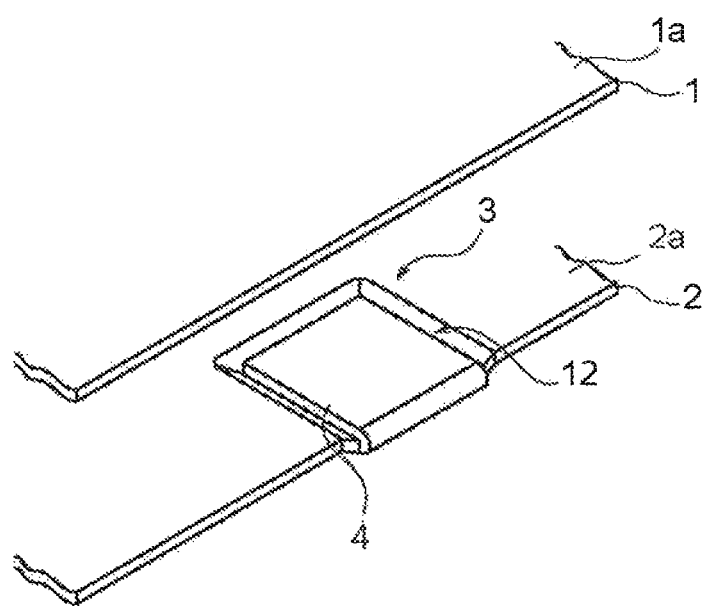
FIG. 17 is a perspective view that illustrates another variation of the discontinuous abutting part in the different material joining method in FIG. 1.
Figure 18:
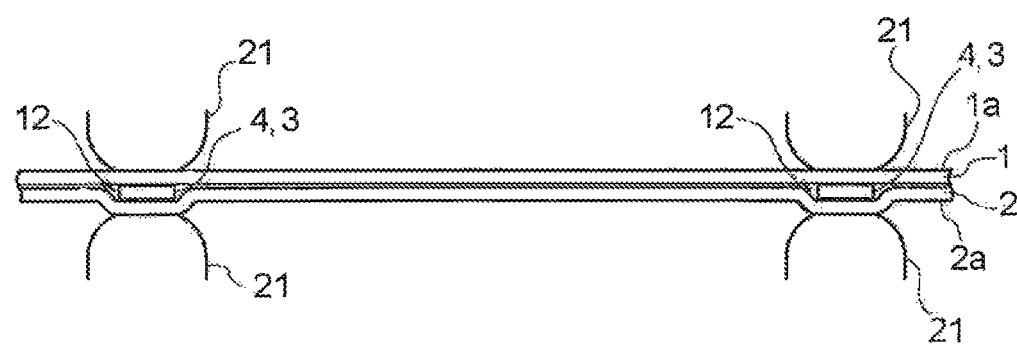
FIG. 18 is an explanatory view of the different material joining method in FIG. 17.

FIG. 17 is a perspective view that illustrates another variation of the discontinuous abutting part 3 in the different material joining method in FIG. 1 described above, and FIG. 18 is an explanatory view of the different material joining method in FIG. 17. In FIG. 17, the first joining member 1 constituted by the steel plate is positioned on the upper side in the illustration and the second joining member 2 constituted by the plate member of aluminum is positioned on the lower side in the illustration. In this variation, before folding working for the folded part 4 of the second joining member 2 is performed, a part of the plate material 2a onto which the folded part 4 abuts is depressed by the plate thickness within a range slightly larger than the folded part 4 and the depressed part is referred to as an accommodation part 12 where the folded part 4 is accommodated. Thus, the upper surface of the folded part 4 after the folding and the upper surface of the plate material 2a of the second joining member 2 itself form an identical plane, that is, become flush with each other. FIG. 18 illustrates a state where the first joining member 1 is placed over the upper surface of the second joining member 2 where the joint parts that each include the folded part 4 in FIG. 17 are provided in two locations, which is viewed from the side of the plate material end. Since in the second joining member 2 where the above-described accommodation part 12 to accommodate the folded part 4 is formed, the accommodation part 12 can be found easily from, for example, the lower side of FIG. 18, it is enabled to determine whether the electrodes 21 abut on the joint parts including the folded part 4 properly in, for example, a mass production resistance welding facility where robots are used. In addition, since a peripheral wall of the above-described accommodation part 12 serves as a dam against the melting material of the second joining member 2 constituted by the plate member of aluminum at the time of energization, outward flow of the melting material from the accommodation part 12 can be inhibited and the melting material of the second joining member 2 can cause interface joining with the first joining member 1 in the accommodation part 12 with reliability. Consequently, the first joining member 1 and the second joining member 2 can be welded with reliability. Moreover, even when the folded part 4 is caused to abut onto the first joining member 1, the plate material 2a of the second joining member 2 itself and the plate material 1a of the first joining member 1 can be caused to abut onto each other and thus, for example, a technique of joining both the joining members 1 and 2 with adhesive or the like can be used in combination.

Although in the above-described first embodiment, the discontinuous abutting part 3 constituted by the folded part 4 is formed in the second joining member 2 constituted by the plate member of aluminum, the discontinuous abutting part 3 is aimed at decreasing the abutment area of the first joining member 1 and the second joining member 2 to decrease the energization cross-sectional area and thus, for example, the discontinuous abutting part 3 constituted by the folded part 4 may be formed in the first joining member 1 constituted by the steel plate.

As described above, in the different material joining method according to each of these embodiments, when the first joining member 1 like a plate, which is high in melting point such as a steel plate, and the second joining member 2 like a plate, which is low in melting point such as a plate member of aluminum, are joined to each other, the discontinuous abutting part 3 formed in the joint part of at least one of the joining member 1 or 2 can decrease the energization cross-sectional area in a direction orthogonal to the pressure-application direction of the electrodes 21. Accordingly, the resistance heat amount at the time of energization increases and the second joining member 2 low in melting point melts, and when for example, the melting material flows along a surface of the first joining member 1 toward the second joining member 2, the melting material of the second joining member 2 causes interface joining with the surface of the first joining member 1 toward the second joining member 2, and both the joining members 1 and 2 are welded. The discontinuous abutting part 3 that can decrease the energization cross-sectional area can be formed in at least one of the first joining member 1 or the second joining member 2 so as to be inseparable by, for example, plate material folding working, hole machining, slot machining, slit machining, embossing, or the like. Even when the formation position of the above-described discontinuous abutting part 3 varies in the joining process as in a case where the press working is performed on the joining members 1 and 2, for example, providing the plurality of discontinuous abutting parts 3 enables any of the discontinuous abutting parts 3 to be sandwiched with the electrodes 21, and the first joining member 1 and the second joining member 2 can be welded in the joint part where the discontinuous abutting part 3 sandwiched with the electrodes 21 is provided. Thus, for example, even in an already-existing mass production resistance welding facility where robots are used, the plate-like joining members 1 and 2 different in melting point, such as a steel plate and a plate member of aluminum, can be welded.

In addition, by setting the discontinuous abutting part 3 so that the energization cross-sectional area in a direction orthogonal to the pressure-application direction of the electrodes 21 is smaller than or equal to an equivalent of the energization cross-sectional area in a case without the discontinuous abutting part, the above-described resistance heat amount at the time of energization can be increased with reliability and thus, the second joining member low in melting point can be melted with reliability and brought into interface joining with the first joining member 1.

Further, when the electrical resistance of the first joining member 1 is larger than the electrical resistance of the second joining member 2 as in a case where the first joining member 1 is a steel plate and the second joining member 2 is a plate member of aluminum, the first joining member 1 large in electrical resistance rises in temperature earlier at the time of energization and its heat can heat and melt the second joining member 2 small in electrical resistance.

Still further, by forming the discontinuous abutting part 3 by at least one of folding working, hole machining, slot machining, slit machining, or embossing on the plate-like joining members 1 and 2, the discontinuous abutting part 3 can be formed in at least one of the first joining member 1 or the second joining member 2 so as to be inseparable and by, for example, performing such working concurrently with the press working on a plate member for a car body, the discontinuous abutting part 3 can be formed in the first joining member 1 and the second joining member 2 without adding a new process in particular. In addition, since such working forms ends, edges, corners, and the like in the discontinuous abutting part 3 and thermal conductivity in the identical joining member 2 can be reduced accordingly, even the second joining member 2 small in electrical resistance such as a plate member of aluminum can be melted with reliability.

Moreover, by forming the discontinuous abutting part 3 constituted by the folded part 4 only in the second joining member 2 low in melting point such as a plate member of aluminum, decrease in plate thickness can be reduced when the second joining member 2 is melted.

Although the different material joining method according to each embodiment is described above, the disclosure is not limited to the configurations described in the above-described embodiments but may be changed variously within the scope of the gist of the disclosure. For example, although in the above-described embodiments, a steel plate and a plate member of aluminum different in melting point are used for the first joining member 1 and the second joining member 2, the joining members 1 and 2 are not limited to a steel plate and a plate member of aluminum. The essence according to an embodiment of the disclosure is in that both the joining members 1 and 2 are welded by melting the second joining member 2 low in melting point and bringing the second joining member 2 into interface joining with the first joining member 1. The method according to an embodiment of the disclosure can be applied to any kind of the joining members 1 and 2 as long as the plate-like joining members 1 and 2 are conformable to this technical feature.

As described above, the method according to an embodiment of the disclosure enables it to weld plate-like joining members different in melting point even in already-existing mass production resistance welding facilities where robots are used and accordingly enables it to perform mass production resistance welding on, for example, steel plates and plate members of aluminum that are used for plate members for car bodies.

The invention claimed is:

1. A different material joining method in which a first joining member having a plate shape and a second joining member having a plate shape are sandwiched with facing electrodes and undergo pressure application and energization, and the first joining member and the second joining member are joined in a first joint part of the first joining member and a second joint part of the second joining member, the second joining member being lower in melting point than the first joining member, the different material joining method comprising:

forming a discontinuous abutting part in either one or both of the joint first part and the second joint part, both the first joining member and the second joining member abutting onto the discontinuous abutting part in a discontinuous state;

melting the second joining member by sandwiching the first joint part and the second joint part with the electrodes and performing the pressure application and the energization on the either one or both of the first joint part and the second joint part in a state where the first joining member and the second joining member are caused to abut onto each other in the either one or both of the first joint part and the second joint part while the discontinuous abutting part is included; and welding both the first joining member and the second joining member by bringing a melting material of the second joining member into interface joining with a surface of the first joining member toward the second joining member.

2. The different material joining method according to claim 1, wherein the discontinuous abutting part is set so that an energization cross-sectional area in a direction orthogonal to a direction of the pressure application by the electrodes is smaller than or equal to an equivalent of an energization cross-sectional area in a case where no discontinuous abutting part is formed.

3. The different material joining method according to claim 1, wherein electrical resistance of the first joining member is larger than electrical resistance of the second joining member.

4. The different material joining method according to claim 2, wherein electrical resistance of the first joining member is larger than electrical resistance of the second joining member.

5. The different material joining method according to claim 1, wherein the discontinuous abutting part is formed by at least one of folding working, hole machining, slot machining, slit machining, or embossing on a plate-like joining member.

6. The different material joining method according to claim 2, wherein the discontinuous abutting part is formed by at least one of folding working, hole machining, slot machining, slit machining, or embossing on a plate-like joining member.

7. The different material joining method according to claim 3, wherein the discontinuous abutting part is formed by at least one of folding working, hole machining, slot machining, slit machining, or embossing on a plate-like joining member.

8. The different material joining method according to claim 4, wherein the discontinuous abutting part is formed by at least one of folding working, hole machining, slot machining, slit machining, or embossing on a plate-like joining member.

9. The different material joining method according to claim 1, wherein the discontinuous abutting part includes a folded part of the second joining member and the folded part is provided only in the second joint part.

10. The different material joining method according to claim 2, wherein the discontinuous abutting part includes a folded part of the second joining member and the folded part is provided only in the second joint part.

11. The different material joining method according to claim 3, wherein the discontinuous abutting part includes a folded part of the second joining member and the folded part is provided only in the second joint part.

12. The different material joining method according to claim 4, wherein the discontinuous abutting part includes a folded part of the second joining member and the folded part is provided only in the second joint part.

13. The different material joining method according to claim 5, wherein the discontinuous abutting part includes a folded part of the second joining member and the folded part is provided only in the second joint part.

14. The different material joining method according to claim 6, wherein the discontinuous abutting part includes a folded part of the second joining member and the folded part is provided only in the second joint part.

15. The different material joining method according to claim 7, wherein the discontinuous abutting part includes a folded part of the second joining member and the folded part is provided only in the second joint part.

16. The different material joining method according to claim 8, wherein the discontinuous abutting part includes a folded part of the second joining member and the folded part is provided only in the second joint part.

17. The different material joining method according to claim 1, wherein the discontinuous abutting part includes a folded part that is formed by folding working.

18. The different material joining method according to claim 17, wherein the folded part is sandwiched between the first joining member and the second joining member.

19. The different material joining method according to claim 17, wherein the folded part is subjected to machining as to form a hole, slit or projection in the folded part.

20. The different material joining method according to claim 17, wherein electrical resistance of the first joining member is larger than electrical resistance of the second joining member.

* * * * *